F. H. PAGE.
POWER UNIT FOR AIRCRAFT.
APPLICATION FILED JULY 7, 1919.
1,319,414.
Patented Oct. 21, 1919.
2 SHEETS—SHEET 1.
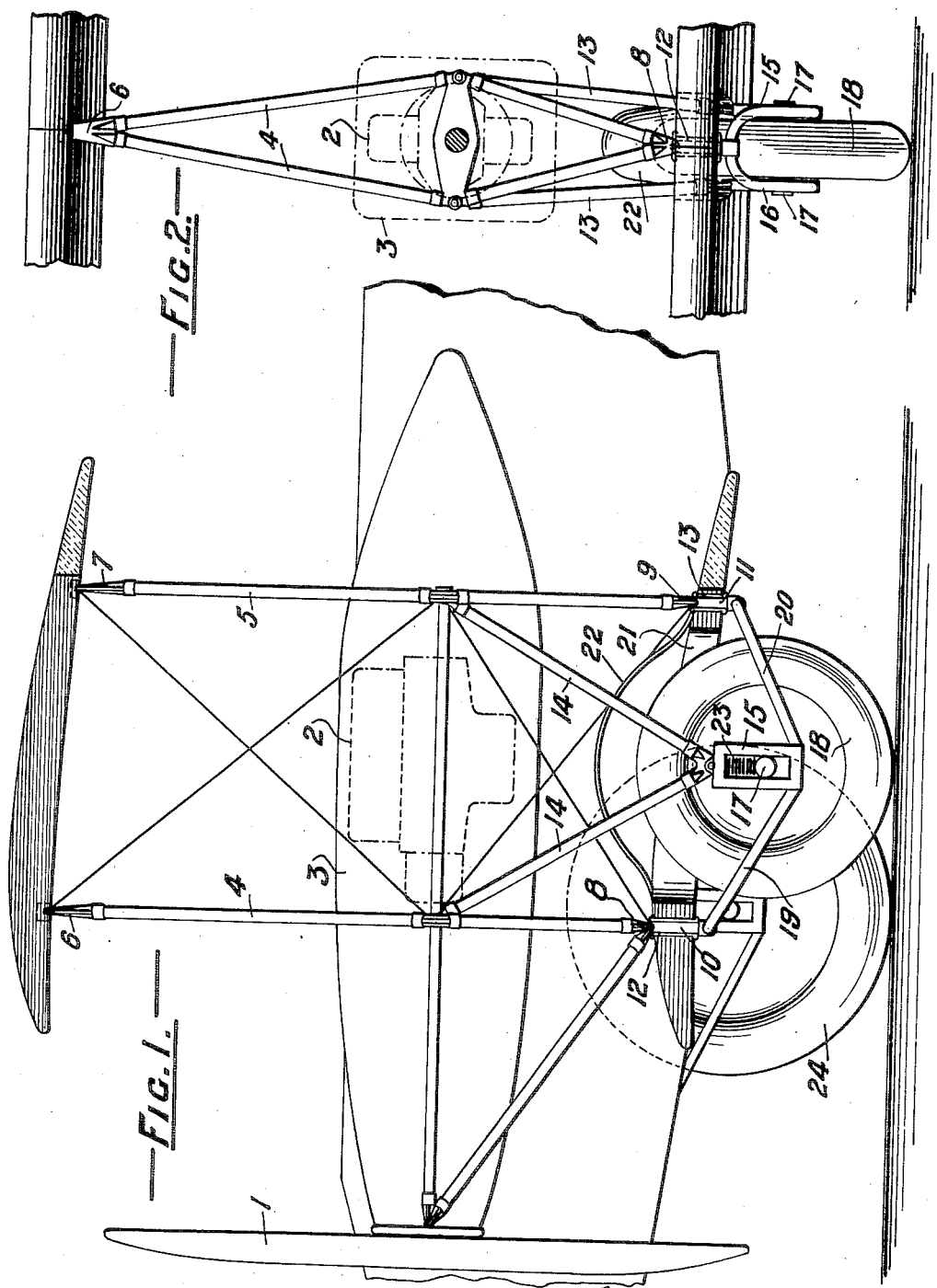

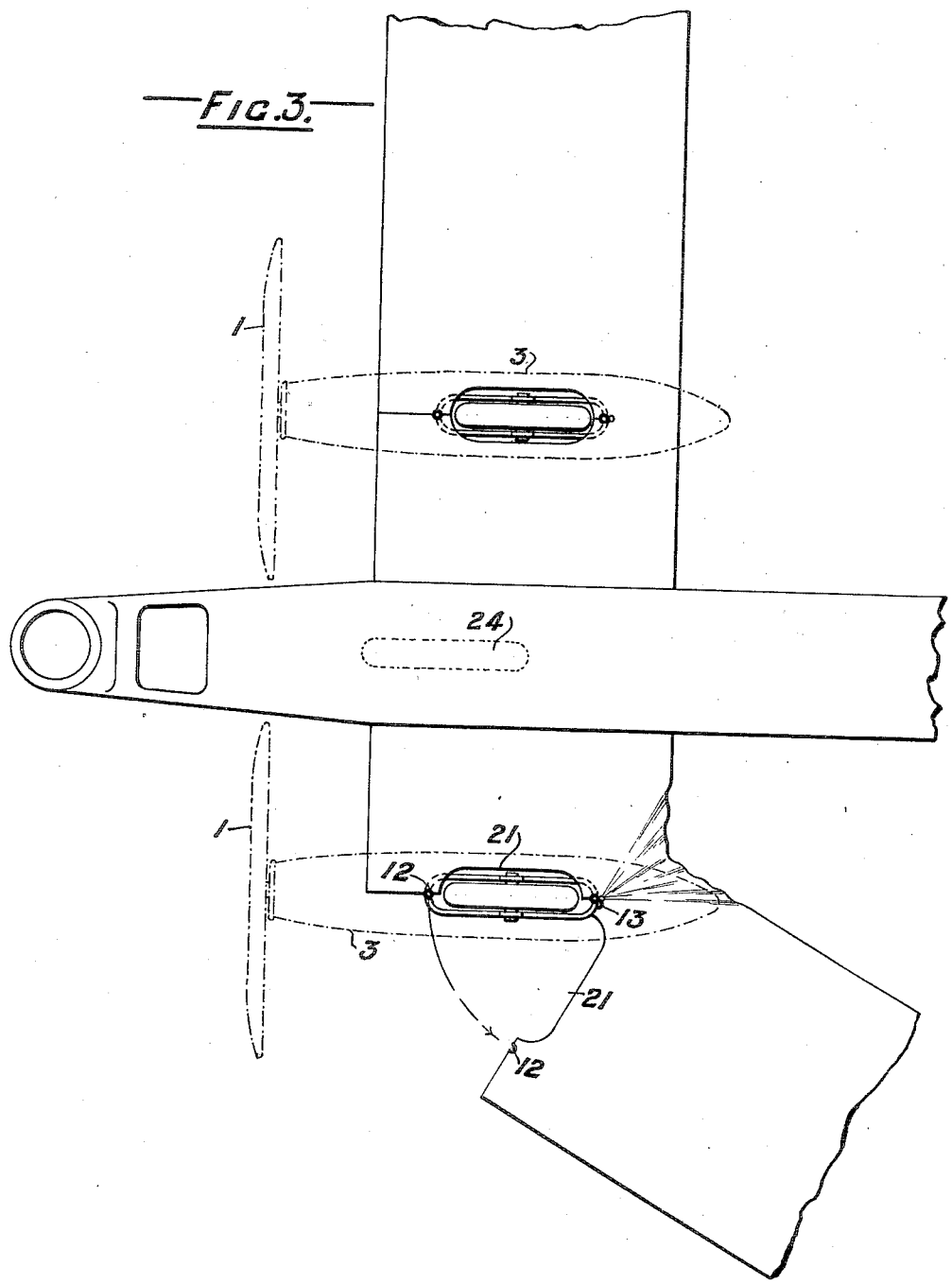

UNITED STATES PATENT OFFICE.

FREDERICK HANDLEY PAGE, OF LONDON, ENGLAND, ASSIGNOR TO HANDLEY PAGE LIMITED, OF LONDON, ENGLAND.

POWER UNIT FOR AIRCRAFT.

1,319,414.   Specification of Letters Patent.   Patented Oct. 21, 1919.

Application filed July 7, 1919. Serial No. 309,152.

*To all whom it may concern:*

Be it known that I, FREDERICK HANDLEY PAGE, a subject of the King of Great Britain, residing at London, England, have invented certain new and useful Improvements in Power Units for Aircraft, of which the following is a specification.

The object of this invention is to provide combined landing-gear and power-plant, forming readily detachable power-units for use with aeroplanes and other types of aircraft.

It is desirable in all aircraft to minimize the resistance of all portions of the machine exposed to the flow of air, and it is also desirable to construct the power-plant as a self-contained unit which may be readily detachable from the main portion of the machine.

According to this invention the engine propeller and oil tanks or multiples of these parts are carried in a frame which is extended downward to the bearings of one or more landing-wheels. The said wheel or wheels support the power-unit when the aircraft is on the ground, and support or partly support a portion of the weight of the air craft by elastic connections which are readily detachable from the air craft. A power-unit thus constructed may be inclosed in a streamline-casing, and the said power-unit may be wheeled into position for attachment to the aircraft without requiring auxiliary mechanism for the support of its weight.

The drawings illustrate the application of the invention to an aeroplane having upper and lower wings, but it may obviously be applied to other types of aircraft, such as mono-wing machines or to airships.

In the drawings, Figure 1 is a side view with the wings in section of so much of an aeroplane as is required in order to illustrate the application of this invention. Fig. 2 is a partial front view of the same mechanism with the propeller removed. Fig. 3 is a plan of a portion of an aeroplane having folding wings and showing the power-units applied to the wings.

Referring particularly to Figs. 1 and 2, 1 is the propeller driven by the engine 2, the latter shrouded by the streamline-casing 3, within which the petrol tanks (not shown in the drawings) may be situated.

The engine-bearers are suitably attached in the diamond frames 4, 5, the upper apices of which 6, 7 are detachably connected to the upper wing preferably by a movable bolt (not shown), the lower apices 8 and 9 of the diamond frames 4 and 5 are connected to sliding members 10, 11, contained in sleeves 12, 13 carried in the wings preferably through the neutral axes of the spars. The diamond frames 4 and 5 connect by means of diagonal members 14 with slide-frames 15, 16 in which the axle-ends 17 of the wheel 18 are carried in such a manner that the wheel 18 is free to slide vertically against springs. The slide-frames 15, 16 are further stayed by diagonal stays 19, 20.

It will be observed that a wheel supported in this way can be contained in a recess 21 in the wing, and a streamline-fairing 22 may be provided to inclose the gap 21 while giving sufficient space for the wheel to rise and fall against the action of its springs. As best seen at Fig. 3 the power-unit is arranged at the hinged division of the wing, the gap 21 being contained partly by the fixed portion of the wing and partly by the hinged movable portion; the sleeves 12, 13 in this arrangement are suitably also divided, one half of each sleeve being carried by the fixed portion of the wing and the other half by the movable portion.

Thus, by opening the wing as shown in the lower part of Fig. 3, the power-unit is exposed and, by disconnecting the apices 6, 7 of the diamond frames from the upper wing, the whole power-unit may be removed with the major part of its weight supported on the wheel 18. A power-unit connected in this way hangs completely from the upper wing when the machine is in flight and the shocks of landing are minimized because the weight of the power-unit is mainly received on its wheel when landing, and the lower wing may move elastically through a short distance depending on the amount of play allowed between the sliding members 10, 11 and the sleeves 12, 13.

A landing-wheel 24 is mounted below a recess in the fuselage and, as shown in Figs. 1 and 3, this landing-wheel is somewhat in advance of the other landing-wheels 18.

What I claim as my invention and desire to secure by Letters Patent is:—

1. A power-unit for aircraft, comprising a propeller and a motor, supported in a frame carrying a landing-wheel or wheels at its lower part and detachably connected to the aircraft.

2. A power-unit for aircraft, comprising a propeller and motor carried in a frame and carrying a wheel or wheels at its lower end detachably connected to the upper wing and located in sliding guides through the lower wing.

3. A power-unit for aircraft, comprising a propeller, motor and fuel supply contained in a streamline-casing, and carried in a frame detachably connected to the upper wing, and guided in releasable slides in the divided portion of the folding lower wing, and supported by a wheel or wheels carried on spring cushions at the base of the frame.

In witness whereof I have hereunto set my hand in the presence of two witnesses.

FREDERICK HANDLEY PAGE.

Witnesses:
GRIFFITH BREWER,
CYRIL GRIFFITH BREWER.